United States Patent Office 3,179,294
Patented Apr. 20, 1965

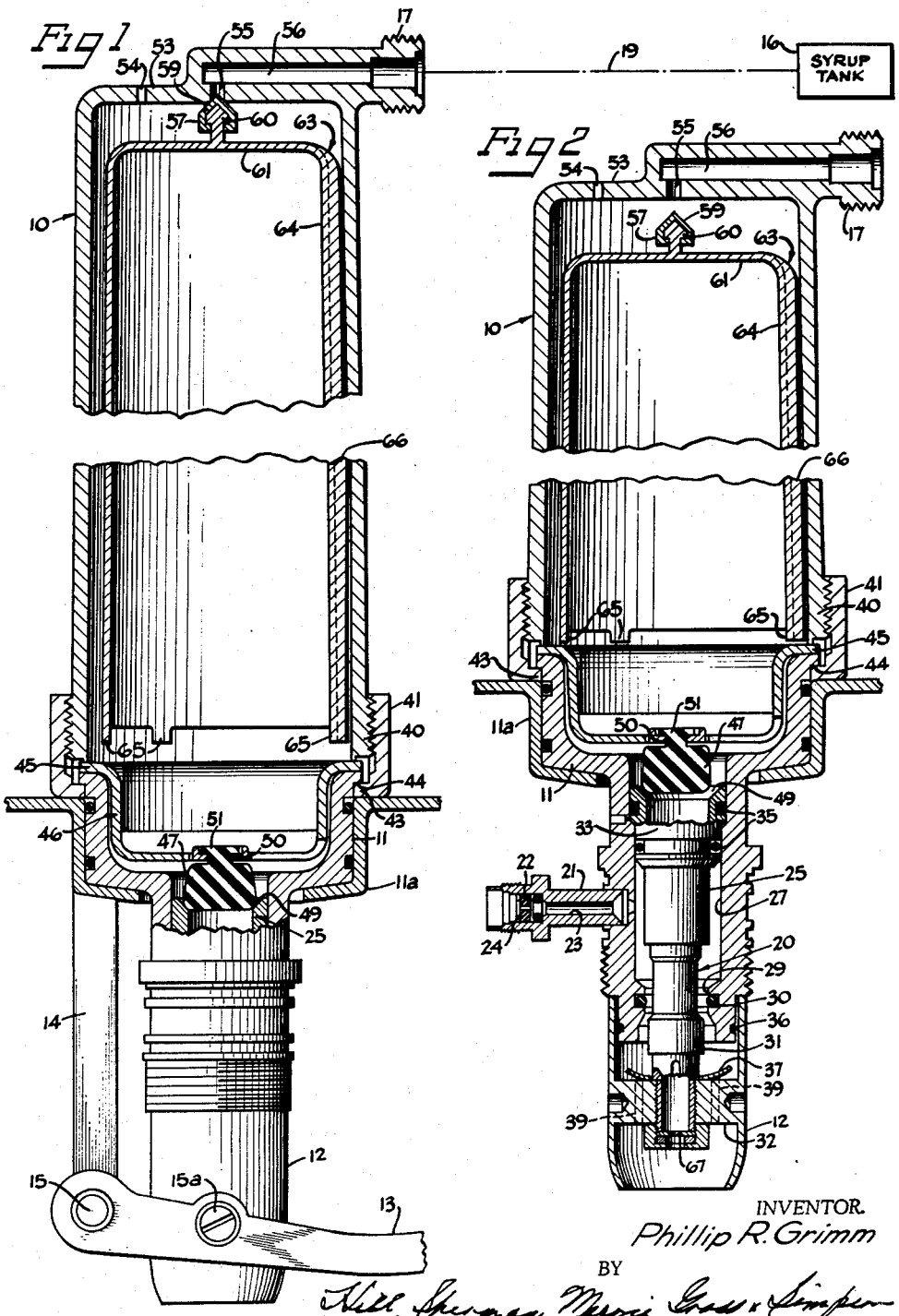

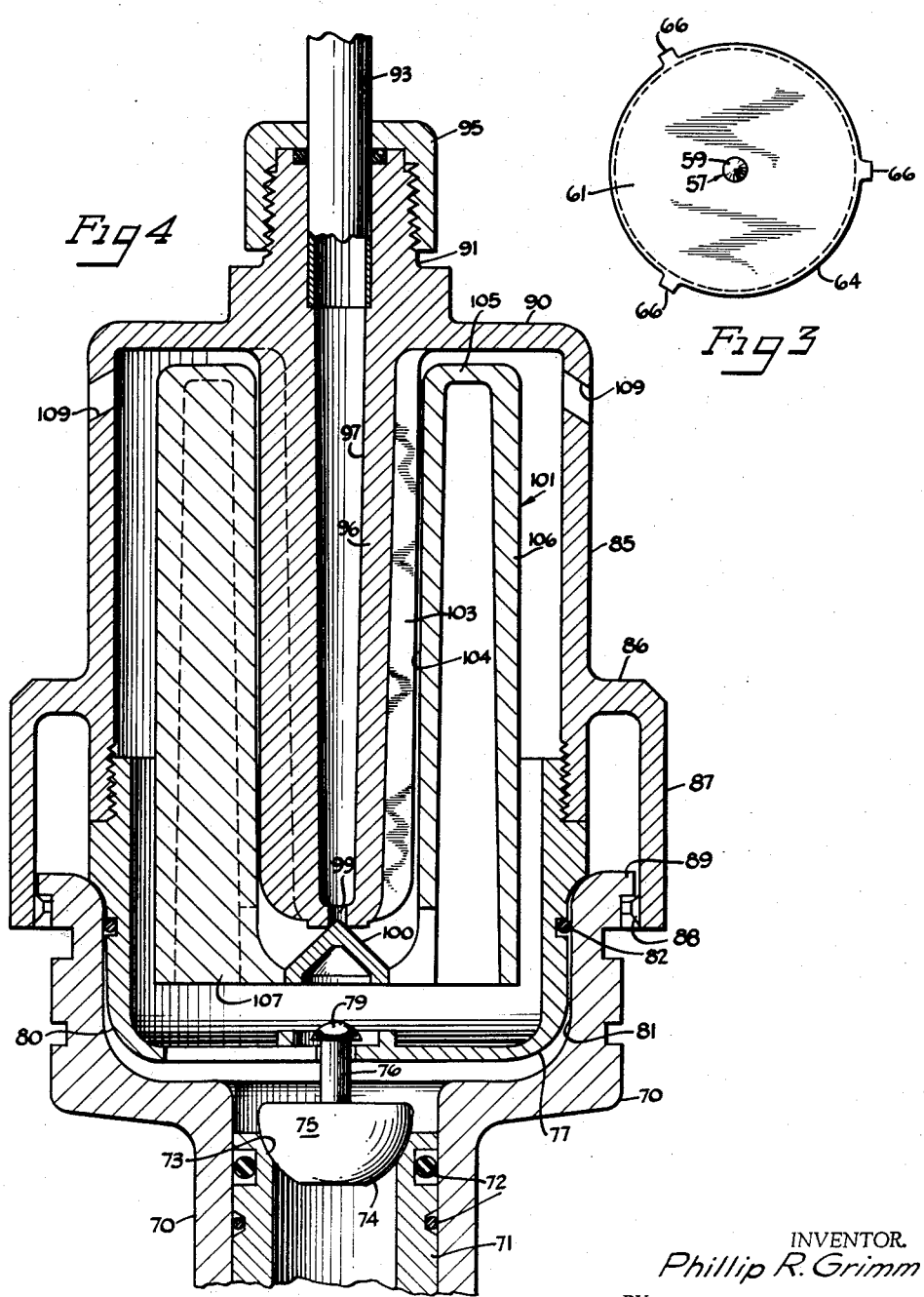

3,179,294
PRESSURIZED CONSTANT FLOW DISPENSER VALVE
Phillip R. Grimm, Des Plaines, Ill., assignor to The Dole Valve Company, a corporation of Illinois
Filed Jan. 11, 1963, Ser. No. 250,871
5 Claims. (Cl. 222—67)

This invention relates to improvements in dispensing devices for syrup and the like, to be mixed with carbonated water in predetermined proportions and delivered as a beverage.

A principal object of the present invention is to provide a novel form of beverage dispenser supplied with syrup under pressure and arranged to deliver a constant flow of syrup regardless of variations in pressure of the syrup.

A further object of the invention is to improve upon the uniformity of the mixture of carbonated beverages by delivering the beverage to a metering chamber under pressure and controlling the delivery of the syrup for proportioning with carbonated water by a simplified form of float, metering syrup into a metering chamber in accordance with the level of syrup in the chamber.

A still further object of the invention is to provide an improved form of float and metering chamber construction maintaining a constant head of syrup in the metering chamber.

These and other objects of the invention will appear from time to time as the following specification proceeds and with reference to the accompanying drawings wherein:

FIGURE 1 is a partial vertical sectional view of a dispensing valve constructed in accordance with the principles of the invention, diagrammatically showing the inlet connected to a syrup tank, and showing the dispensing valve in a closed position;

FIGURE 2 is a vertical sectional view taken through the dispensing valve, showing the valve in its open position;

FIGURE 3 is a top plan view of the float shown in FIGURES 1 and 2; and

FIGURE 4 is a vertical sectional view taken through a modified form of metering chamber and float constructed in accordance with the principles of the present invention.

In the embodiment of the invention illustrated in the drawings, 10 generally designates a metering chamber for syrup in association with a capillary housing 11, disposed therebeneath, terminating in a spout or nozzle 12 for delivering uniformly mixed quantities of carbonated water and syrup, to be used as a beverage.

The metering chamber 10 and capillary housing 11 may be mounted on a stationary support shown as being a receptacle 11a which may be mounted on a counter and the like, and which also forms a support for the fulcrum for a hand lever 13, controlling the flow of carbonated water into the capillary housing and out through the spout 12 and controlling the flow of syrup to the capillary housing for mixture with carbonated water, in a manner which will hereinafter more clearly appear as this specification proceeds. The hand lever 13, as shown in FIGURE 1, is pivotally mounted between spaced hangers 14, depending from the support or receptacle 11a, on a pivot pin 15 and extends along opposite sides of and is pivotally connected to the spout or nozzle 12, intermediate the ends of said hand lever, or trunnion pins 15a for moving said spout and the capillary housing 11 downwardly to effect the delivery and mixture of carbonated water and syrup.

The syrup is contained in a tank, diagrammatically shown in FIGURE 1 and indicated by reference character 16. The tank 16 may be remote from the metering chamber 10 and is connected with an inlet fitting 17 leading into the top of the metering chamber 10 through a pipe 19. The syrup tank 16 may be pressurized by carbon dioxide or any other suitable pressure medium to deliver syrup to the metering chamber 10 under pressure.

The capillary housing 11 forms a housing for a capillary valve member 20 and a passageway for carbonated water between the interior of the wall of the housing and the exterior of the valve member 20. The capillary valve member 20 is slidably mounted in the capillary housing 11 for vertical movement relative thereto. The hand lever 13 serves to move said valve member into position to deliver carbonated water along the exterior of the capillary valve member, and syrup through the hollow interior of the capillary valve member, for mixture with the carbonated water.

As shown in FIGURE 2 an inlet fitting 21 for carbonated water enters the capillary housing 11 intermediate the ends thereof and has a seat 22 therein on the upstream side of a reduced area passageway 23. The seat 22 may be made of nylon to resist any corrosive action of the carbonated water and cooperates with a resilient flow control washer 24 flexing to reduce the area through the center orifice leading through said washer, upon increases in pressure of the carbonated water, to provide a constant delivery rate of carbonated water to the capillary housing 11, regardless of variations in pressure of the carbonated water upstream of the fitting 21.

The capillary valve 20 is in the form of a tube 25 extending along and depending from the capillary housing 11, the exterior of which forms a valve controlling the flow of carbonated water through the spout 12, and the interior which forms a valve and flow passage for syrup.

The capillary housing 11 has a generally cylindrical interior wall portion 27 terminating into the restricted portion 29, adjacent the lower end thereof, having an O-ring 30 seated therein and cooperating with a land 31 on the tube 25 intermediate the ends of said tube, to form a valve controlling the delivery of carbonated water to the spout 12. The tube 25 has an enlarged diameter portion 33 at the upper end portion thereof having O-rings 35 seated therein and engaging the wall 27 to seal the wall 27 from the leakage of carbonated water into the metering chamber 10.

The spout 12 is generally cylindrical in form having a converging lower end portion and an intermediate wall portion 32 threaded on the lower end portion of the tube 25. An O-ring 36 seated in the lower end portion of the capillary housing 11 has sealing engagement with the interior wall of the spout 12. The intermediate wall portion 32 of the nozzle 12 has an annular baffle 37 of an inverted frusto-conical form seated on said wall portion and facing the end of the capillary housing. The intermediate wall portion 32 has a plurality of vertical passages 39 extending therethrough. The baffle 37 thus serves to deflect the carbonated water flowing from the end of the capillary housing outwardly toward the wall of the spout 12, to quiet the carbonated water so it will pass through the passageways 39, 39 for mixture with the syrup, in a relatively quiescent state.

The metering chamber 10 may be made from a suitable metal or from a thermoplastic material and is generally cylindrical in form and has a threaded lower end portion 40 retained to project upwardly of the capillary housing, as by a nut 41, having a radially inwardly extending annular flange 43 engaging underneath an annular shoulder 44 at the upper end portion of the capillary housing 11. The nut 41 brings the lower end of the metering chamber 10 into engagement with an annular flange 45 of a spider 46. The spider 46 has a resilient plug 47 depending from the center thereof and forming a seat for an annular valve 49 at the upper end of the sleeve 25 and shown as being formed integrally with said sleeve.

As shown in FIGURES 1 and 2, the plug 47 has a reduced neck 50 slidably extending through an apertured portion of the spider 46 and terminating at its upper end in a head 51 retaining said plug to said spider. The space between the top of the plug 47 and the underside of the spider 46 accommodates limited upward movement of the plug 47 when moving the sleeve 21 upwardly to close the annular valve 49. The plug 47 may be made from rubber, neoprene, or any other well known substitute for rubber.

The metering chamber 10 has a top wall 53 having a central inlet orifice 55 leading therethrough and in communication with the inlet fitting 17, through a passageway 56 extending along said top wall. An air vent 54 leads through the top wall 53.

A resilient metering valve 57 having a conical valve face 59, the apex of which is in axial alignment with the axis of the inlet orifice 55 is mounted on a button 60, projecting upwardly of a top wall 61 of a float 63 slidably movable along the interior cylindrical wall of the metering chamber 10.

The float 63 may be made from a suitable thermoplastic material or from a thin metal and is shown in FIGURES 1 and 2 as being of an inverted cup or glass-like form. Said float has a generally cylindrical wall 64 slightly tapered to enable drawing of the float from its mold during casting. The cylindrical wall 64 has spaced nips 65 projecting downwardly of its bottom end and spacing the lower end portion of the wall 64 above the flange 45, to accommodate syrup to pass along the outer side of the float 63 into the metering chamber 10.

The wall 64 has a plurality of ribs 66 extending along the outer side thereof and spacing the wall 64 from the interior cylindrical wall of the metering chamber 10, to accommodate syrup to pass downwardly along the float and fill the metering chamber to cause the float to rise and engage the conical valve face 59 with the inlet 55.

The discharge end portion of the tube 25 terminates into an orifice 67 of smaller cross-section area than the flow passageway between the valve 49 and valve seat 47, so that syrup can flow into the interior portion of the tube 25 at a faster rate than it is discharged through the orifice 67, to accommodate the backing up of syrup into the metering chamber 10.

The float 63, therefore, will float on the syrup in the metering chamber, metering syrup through the orifice 55, in accordance with the level of syrup in the metering chamber and will maintain a constant head of syrup in said metering chamber. This will effect a constant flow of syrup through the orifice 67 for mixture with the carbonated water.

In FIGURE 1, the annular valve 49 is shown as being moved upwardly into engagement with the resilient valve seat 47 by upward movement of the sleeve 25 effected by pressure on the handle 13. As the valve 49 is initially closed, syrup will be supplied through the orifice 55 into the metering chamber 10 until the syrup in said metering chamber has moved the float 63 upwardly a distance sufficient to close the inlet 55. The inlet 55 will remain closed until pressure is exerted on the handle 13 to move the valve 49 away from the valve seat 47, to thereby accommodate the flow of syrup through the orifice 67 for mixture with the carbonated water in a conventional manner. In this condition, the metering valve 59 will meter syrup into the chamber 10 in accordance with the level of liquid in the chamber, and maintain a substantially constant level of liquid in the metering chamber.

In the modified form of the invention illustrated in FIGURE 4, I have shown a capillary housing 70 having a tube 71 movable therealong and sealed to the interior wall of said capillary housing as by O-rings 72.

The tube 71 is shown as having an interior annular generally spherical annular valve 73 engageable with a corresponding generally spherical face 74 of a valve seat 75. The valve seat 75 has a stem 76 projecting upwardly therefrom and slidably carried in a spider 77. A button 79 retains the valve 74 to the spider 77.

The spider 77 has a generally cylindrical wall portion 80 projecting upwardly from the bottom thereof and sealed within an enlarged diameter wall portion 81 of the capillary housing 70, as by an O-ring 82. The wall portion 80 of the spider 77 is threaded at its upper end portion and has a metering chamber 85 threaded thereon and projecting upwardly therefrom. The metering chamber 85 has an intermediate radial flanged portion 86 having a cylindrical wall 87 depending therefrom and having inwardly extending circumferentially spaced inclined retaining ribs 88 engaging beneath circumferentially spaced out turned radial flanges 89 of the wall of the capillary housing 70, for retaining the metering chamber to said capillary housing, and for retaining the wall 80 of the spider 77 into sealing engagement with the interior wall portion of the capillary housing 70.

The metering chamber 85 has a top wall 90 having an inlet fitting 91 extending upwardly therefrom. A pipe 93 for syrup under pressure enters the inlet fitting 91 and is sealed thereto as by a gland nut 95.

Extending downwardly of the top wall of the metering chamber 85 in axial alignment with the longitudinal axis of the pipe 93 is a guide member 96 having a flow passageway 97 leading downwardly therealong. The flow passageway 97 gradually converges from the pipe 93 and terminates into an orifice 99 at the bottom of said guide member and adjacent the lower end portion of the metering chamber. The orifice 99 is adapted to be engaged by a metering valve 100 on the lower end portion of a float 101 guided for slideable movement along the guide member 96.

The guide member 96 has guide ribs 103 projecting radially therefrom having guiding engagement with an interior wall 104 of the float 100 for guiding said float for vertical movement along said guide member and for accommodating syrup to flow into the space between said guide member and the interior wall of said float.

The interior wall 104 of the float 100 has an annular flange 105 projecting outwardly from the upper end portion thereof. A wall 106 extends downwardly of the outer end portion of the annular flange 105, and with said flange and interior wall provides an air space to effect upward movement of the float as syrup fills the metering chamber 85. A series of radial ribs 107 extend across said air space.

In this form of the invention, the valve 100 controls the passage of fluid through the orifice 99 in the same manner the valve 57 controls the passage of fluid through the inlet orifice 55. Air passageways 109 accommodate the flow of air outwardly of the metering chamber 85 as the metering chamber is being filled with syrup and the float rises upwardly along the guide member 96.

While I have herein shown and described several forms in which my invention may be embodied, it should be understood that various modifications and variations in the invention may be attained without departing from the spirit and scope of the novel concepts thereof.

I claim as my invention:

1. In a syrup dispensing device, a generally cylindrical metering chamber having a closed top, an inlet leading through said top, a source of supply of syrup under pressure having communication with said inlet, a metering float within said chamber having a generally cylindrical wall and a top wall extending across the top of said cylindrical wall, a resilient valve extending above said top wall cooperating with said inlet to meter the flow of syrup into said chamber in accordance with the level of liquid in said chamber, guide ribs extending radially outwardly of said float having guiding engagement with the cylindrical wall of said chamber, a spider fixedly mounted in the bottom of said chamber having a resilient plug slidably carried thereby for limited vertical movement with respect thereto and depending from said spider within said outlet, an annular valve mounted for vertical movement toward and from said spider to engage said valve seat and control the flow of syrup through the bottom of said chamber, and a flow orifice at the outlet end of said annular valve and having a flow area so proportioned with respect to the flow area of said inlet to maintain a head of syrup within said chamber.

2. In a syrup dispensing device, a source of supply of syrup under pressure, a metering chamber generally cylindrical in form and having a closed top, an inlet into said chamber through the top thereof and having communication with said source of supply of fluid under pressure, a capillary housing extending downwardly from the bottom of said chamber and having a passageway leading therealong, forming an outlet from said chamber, a spider seated between said capillary housing and said mixing chamber and having a rubber plug slidably secured to and depending therefrom and forming an outlet valve seat, an annular valve movable along said passageway in cooperation with said seat and controlling the flow of syrup through said passageway, an inverted cup-like float within said metering chamber and having a closed top having a resilient valve projecting upwardly from the axial center to said top and metering the flow of syrup through said inlet in accordance with the level of syrup in said chamber, said float having a generally cylindrical wall having ribs extending therealong, spacing said float from the wall of said chamber and accommodating the flow of syrup along the wall of said float and having nibs depending from the lower end thereof spacing the lower end of said float above the bottom of said chamber to accommodate syrup to flow thereby.

3. In a syrup dispensing device, a source of supply of syrup under pressure, a metering chamber generally cylindrical in form and having a closed top, an inlet into said chamber through the top thereof and having communication with said source of supply of fluid under pressure, a capillary housing extending downwardly from the bottom of said chamber and having a passageway leading therealong, forming an outlet from said chamber, a spider seated between said capillary housing and said mixing chamber and having a rubber plug slidably secured to and depending therefrom and forming an outlet valve seat axially movable with respect to said spider, an annular valve movable along said passageway in cooperation with said seat and controlling the flow of syrup through said passageway, an inverted cup-like float within said metering chamber and having a closed top and a cylindrical wall depending therefrom, said top having a resilient valve projecting upwardly therefrom and metering the flow of syrup through said inlet in accordance with the level of syrup in said chamber, said generally cylindrical wall having ribs extending therealong and radially outwardly therefrom, spacing said float from the wall of said chamber and having nibs depending from the lower end thereof spacing the lower end of said float above the bottom of said chamber, a spout at the lower end of said capillary housing, and a metering orifice at the discharge end of said spout having a flow area so related with respect to the flow area of said inlet to maintain a constant head of syrup within said chamber as long as syrup enters said chamber through said inlet.

4. A syrup dispensing device comprising a capillary housing having an enlarged diameter upwardly opening upper end portion having a reduced diameter passageway leading therefrom, a spider seated in said enlarged diameter upper end portion of said capillary housing, a valve seat mounted in said spider for limited slidable movement with respect thereto and depending therefrom into said outlet, an annular valve movable along said outlet into engagement with said valve seat to block the flow of syrup through said outlet, a metering chamber connected to said enlarged diameter upper end portion of said capillary housing and extending upwardly therefrom, said metering chamber having a closed top having an inlet leading thereinto along the center thereof and having a guide depending from said top and extending downwardly along said metering chamber, having a passageway leading therealong and opening at the bottom thereof, a float having an open center portion guided for movement along said guide and having a downwardly opening open portion forming an air space, and a valve at the lower end of said open center portion of said float cooperating with said passageway to block the flow of syrup through said passageway upon upward movement of said float along said guide.

5. A syrup dispensing device comprising a capillary housing having an enlarged diameter upwardly opening upper end portion having a reduced diameter passageway leading therefrom, a spider seated in said enlarged diameter upper end portion of said capillary housing, a valve seat mounted in said spider for limited slidable movement with respect thereto and depending therefrom into said outlet, an annular valve movable along said outlet into engagement with said valve seat to block the flow of syrup through said outlet, a metering chamber connected to said enlarged diameter upper end portion of said capillary housing and extending upwardly therefrom, said metering chamber having a closed top having an inlet leading thereinto along the center thereof and having a guide depending from said top and extending downwardly along said metering chamber, having a converging passageway leading downwardly therealong from said inlet and having an orifice at the lower end thereof, said guide also having ribs projecting radially therefrom, a float having an open center portion guided for movement along said ribs, and an upwardly facing valve at the lower end of said open center portion of said float cooperating with said orifice and metering the flow of syrup therethrough in accordance with the level of syrup in said metering chamber.

References Cited by the Examiner

UNITED STATES PATENTS

| 2,667,990 | 2/54 | Mojonnier. | |
| 2,673,005 | 3/54 | Brown | 222—67 |
| 3,078,013 | 2/63 | Forbes | 222—67 |

LOUIS J. DEMBO, *Primary Examiner.*